(12) United States Patent
Hwang

(10) Patent No.: US 6,785,298 B1
(45) Date of Patent: Aug. 31, 2004

(54) METHOD FOR DETECTING TRANSMISSION RATE OF CODE DIVISION MULTIPLE ACCESS (CDMA) TYPE COMMUNICATION TERMINALS

(75) Inventor: Sung-Soo Hwang, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/501,187

(22) Filed: Feb. 10, 2000

(30) Foreign Application Priority Data

Feb. 10, 1999 (KR) .......................................... 1999-4611

(51) Int. Cl.[7] ................................................ H04J 13/00
(52) U.S. Cl. ...................... 370/479; 370/335; 370/342; 370/465; 370/468; 375/225; 375/343
(58) Field of Search ................................ 370/310, 320, 370/342, 315, 316, 319, 431, 441, 464, 479, 498, 503, 509, 252, 335, 465, 468; 375/225, 343

(56) References Cited

U.S. PATENT DOCUMENTS

| | | | | |
|---|---|---|---|---|
| 5,566,206 A | * | 10/1996 | Butler et al. ................. | 375/225 |
| 5,751,725 A | * | 5/1998 | Chen .......................... | 714/708 |
| 6,147,964 A | * | 11/2000 | Black et al. ................. | 370/209 |
| 6,418,163 B2 | * | 7/2002 | Tidemann et al. .......... | 375/225 |

* cited by examiner

Primary Examiner—Huy D. Vu
Assistant Examiner—Thomas E. Volper
(74) Attorney, Agent, or Firm—Cha & Reiter, L.L.C.

(57) ABSTRACT

A method of detecting a transmission rate in a wireless communication terminal employing a Code Division Multiple Access (CDMA) scheme, comprising the steps of: decoding and encoding, at a selected transmission rate, a frame signal corresponding to a data frame currently received by a de-interleaver from a modulator-demodulator (modem) in response to the reception of the data frame; comparing the encoded frame signal with the current frame signal being received from the modulator-demodulator, and as a comparison result, determining whether there are errors in an amount less than a predetermined threshold value; transmitting a signal indicative of the selected transmission rate to a vocoder if there are errors in an amount less than the predetermined threshold value, and determining whether the reception of all data frames is complete; returning to the encoding and decoding step if the reception of all data frames is not complete; and, selecting another transmission rates other than the previously selected transmission rate used to decode and encode the current frame signal if there are errors in an amount greater than the predetermined threshold value, then returning to the encoding and decoding step.

1 Claim, 3 Drawing Sheets

METHOD FOR DETECTING TRANSMISSION RATE OF CODE DIVISION MULTIPLE ACCESS (CDMA) TYPE COMMUNICATION TERMINALS

CLAIM OF PRIORITY

This application makes reference to, incorporates the same herein, and claims all benefits accruing under 35 U.S.C. Section 119 from an application for METHOD FOR DETECTING TRANMISSION RATE OF CODE DIVISION MULTIPLE ACCESS (CDMA) TYPE COMMUNICATION TERMINALS filed earlier in the Korean Industrial Property Office on the 10th day of Feb. 1999 and there duly assigned Serial No. 4611/1999.

BACKGROUND OF THE INVENTION

1. Field of the Invention

The present invention relates to a wireless communication terminal employing a Code Division Multiple Access (CDMA) scheme, and more particularly to a method for rapidly detecting a transmission rate during the demodulating operation.

2. Description of the Related Art

In general, a wireless communication terminal employing Code Division Multiple Access (CDMA) scheme is adapted to transmit the compressed data according to a predetermined transmission rate. The predetermined transmission rate may be one of the following: 9.6 Kbps, 4.8 Kkbps, 2.4 Kbps, or 1.2 Kbps. The implementation of a paging channel allows the wireless communication terminal to know the specific transmission rate to be used so that the transmission rate does not need to be detected from the received data during the demodulation process. When a telephone call is made through the use of a traffic channel, the transmission rate is variable depending on the amount of voice data involved in the transmission. For example, when either the calling party or the called party is in a mute state, a transmission rate of 1.2 K is used. However, when either party produces sound, a transmission rate of 9.6 K is used. Accordingly, the demodulation process for the received signals always requires the knowledge of the transmission rate at which the data is to be transmitted.

Conventionally, the detection of a transmission rate requires that the received data to be decoded and the decoded data signal to be encoded again at one of the transmission rates, such as 9.6 kbps, 4.8 kbps, 2.4 kbps, and 1.2 kbps. Then, the encoded signal is compared with the originally received signal prior to the decoding process. Based on the comparison result, the received data is adapted to be demodulated at an optimal transmission rate. A continuous execution of the above operation for every frame (20 microsec) of the received data is required to detect the transmission rate. Accordingly, there have been some problems because the detection of the transmission rate requires a series of data processing operations, such as decoding, encoding and comparing operation. Thus, it takes a relatively long period of time to detect the transmission rate at which the data is to be transmitted. Moreover, when the transmission rate is diversified, the hardware component of the communication terminal is easily overloaded, and, in some cases, it may be impossible to communicate in real time. Furthermore, such a conventional transmission rate detection method may be unsuitable for future communication systems requiring more variety of transmission rates.

SUMMARY OF THE INVENTION

Therefore, the object of the present invention is to provide a method for rapidly detecting the transmission rate at which the data is to be transmitted during the demodulation operation of the received data signal in wireless communication terminals employing the Code Division Multiple Access (CDMA) scheme.

In accordance with one embodiment of the present invention, a method of detecting a transmission rate in a wireless communication terminal of a Code Division Multiple Access (CDMA) scheme includes the steps of:

decoding and encoding, at a selected transmission rate, a frame signal corresponding to a data frame currently being received by a de-interleaver from a modulator-demodulator (modem) in response to the reception of the data frame;

comparing the encoded frame signal with the current frame signal being received from the modulator-demodulator to determine whether there are errors in an amount less than a predetermined threshold value;

transmitting a signal indicative of the selected transmission rate to a vocoder if there are errors in an amount less than the predetermined threshold value and determining whether the reception of all data frames is completed;

returning to the encoding and decoding step if the reception of all data frames is not completed; and, selecting another one of the transmission rates other than the previously selected transmission rate used to decode and encode if there are errors in an amount greater than the predetermined threshold value, then returning to the encoding and decoding step.

According to another embodiment of the present invention, a method of detecting a transmission rate in a wireless communication terminal of a Code Division Multiple Access (CDMA) scheme includes the steps of:

decoding and encoding, at each of a plurality of transmission rates, a frame signal corresponding to a data frame currently being received by a de-interleaver from a modulator-demodulator (modem) in response to the reception of the data frame;

comparing each of the encoded signals with the current frame signal received from the modulator-demodulator, respectively, and detecting a specific transmission rate generating the lowest error;

transmitting a signal indicative of the detected transmission rate having the lowest error to a vocoder and setting the detected transmission rate as a new transmission rate;

determining whether the reception of all data frames from the modulator-demodulator is complete;

if reception of all data frames is not complete, encoding and decoding, at the new transmission rate, a next frame signal corresponding to the data frame received from a modulator-demodulator via the de-interleaver;

comparing the encoded frame signal with the next frame signal received from the modulator-demodulator to determine whether there are errors in an amount less than a predetermined threshold value;

if there are errors in an amount less than the predetermined threshold value, transmitting a signal indicative of the set transmission rate to a vocoder and returning to receive the next frame signal; and, if there are errors in an amount greater than the predetermined threshold value, returning to the first decoding and encoding step at each of a plurality of transmission rates.

A BRIEF DESCRIPTION OF THE DRAWINGS

The foregoing and other objects, features and advantages of the present invention will become more apparent from the following detailed description when taken in conjunction with the accompanying drawings in which.

A DETAILED DESCRIPTION OF THE PREFERRED EMBODIMENT

Reference will now be made in greater detail to the preferred embodiments of the present invention. In the following description of the present invention, numerous specific details, such as concrete process routines, are set forth to provide a more thorough understanding of the present invention. It will be apparent, however, to those skilled in the art that the invention may be practiced in other than the previously mentioned specific details. For the purpose of clarity, a detailed description of known functions and configurations incorporated herein will be omitted as it may make the subject matter of the present invention unclear.

Figure 1:
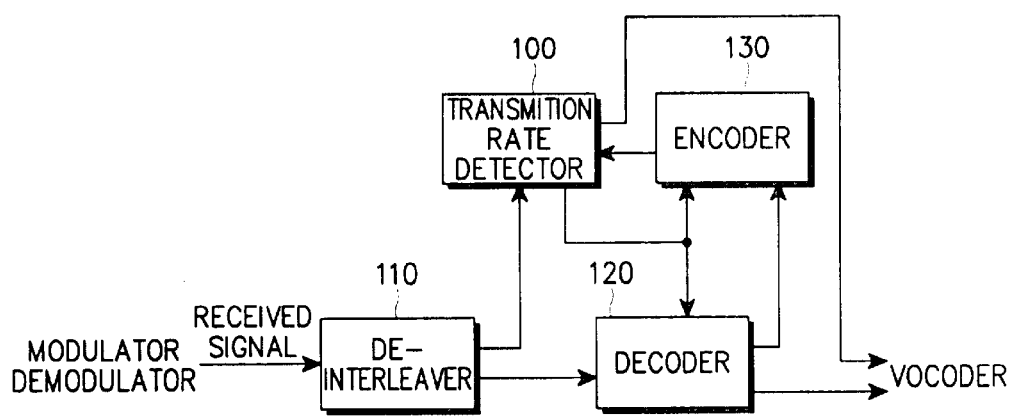
FIG. 1 is a block diagram illustrating the construction of a demodulating device for detecting a transmission rate in a Code Division Multiple Access (CDMA) type communication terminal according to the preferred embodiment of the present invention.

FIG. 1 is a block diagram illustrating the construction of a demodulating device for detecting the transmission rate in a Code Division Multiple Access (CDMA) type communication terminal during the demodulating operation according to a preferred embodiment of the present invention.

As illustrated in FIG. 1, the demodulating device includes a transmission rate detector 100, a de-interleaver 110, a decoder 120, and an encoder 130.

The transmission rate detector 100 compares the de-interleaved signal from the de-interleaver 110 with the decoded and encoded signal from the encoder 130, evaluates error based on the comparison of these two signals, then selects an optimal transmission rate yielding a lowest error to be applied to a vocoder (not shown). The de-interleaver 110 serves to de-interleave the received frame signal corresponding to the data frame outputted from the modulator-demodulator(modem) for application to the transmission rate detector 100 and the decoder 120. The decoder 120 acts to decode the de-interleaved signal outputted from the de-interleaver 110 at a predetermined transmission rate, which is controlled by of the transmission rate detector 100, in order to apply the decoded signal to the encoder 130 and eventually to the vocoder. The encoder 130 encodes the decoded signal outputted from the decoder 120 at the predetermined transmission rate according to the control by the transmission rate detector 100 for application to the transmission rate detector 100.

Figure 2:
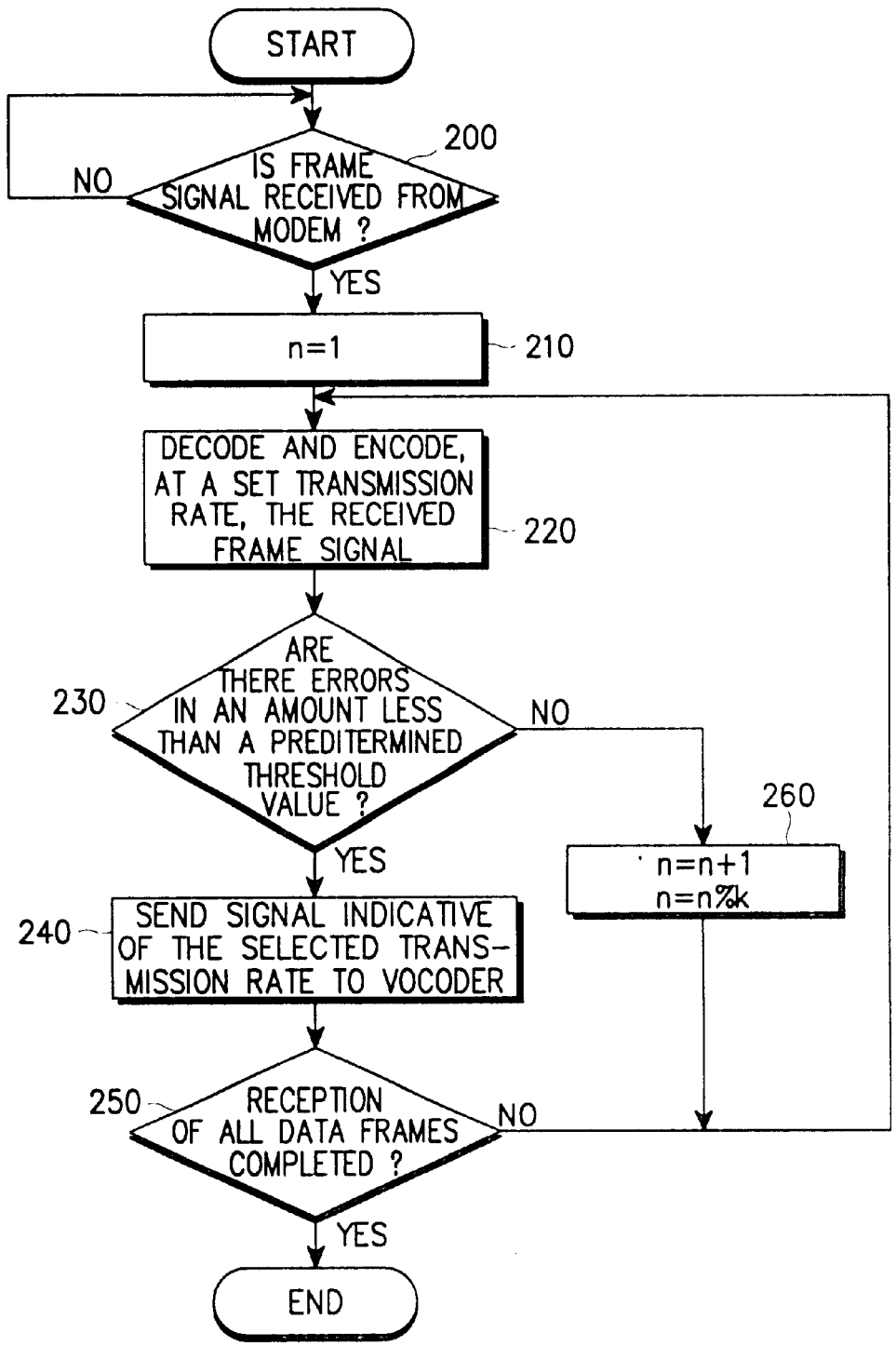
FIG. 2 is a flowchart illustrating the process of implementing the demodulating operation according to the other preferred embodiment of the present invention; and, FIG. 3 is a schematic view illustrating the process of implementing the demodulating operation according to another preferred embodiment of the present invention.

FIG. 2 is a flowchart illustrating the process of implementing the demodulating operation according to a preferred embodiment of the present invention.

At step 200, the transmission rate detector 100 determines whether a data frame is received by the de-interleaver 110 from the modulator-demodulator. If it is determined in step 200 that the de-interleaver receives the data frame from the modulator-demodulator, the program proceeds to step 210 in which the transmission rate detector 100 sets the parameter"n", representative of the transmission rate according to the preferred embodiment of the present invention, to "1". In the subsequent step 220, the transmission rate detector 100 allows the frame signal corresponding to the received data frame to be decoded and encoded by the decoder 120 and the encoder 130, respectively, at the transmission rate which is responsive to the set parameter"n." In the next step 230, the transmission rate detector 100 compares the encoded frame signal from the encoder 130 with the signal de-interleaved by the de-interleaver 110 prior to the decoding process, and based on the comparison result, the transmission rate detector 100 determines whether there are errors in the amount less than a predetermined threshold value. Namely, when a data frame is received by the de-interleaver 110 from the modulator-demodulator, a frame signal corresponding to the data frame from the de-interleaver 110 is compared with the output signal produced by the decoding and encoding of the frame signal at the predetermined transmission rate, and then it is determined based the comparison result whether the transmission error is less than the predetermined threshold value. If it is determined at step 230 that the comparison result error is less than the predetermined threshold value, the program proceeds to step 240 where the transmission rate detector 100 transmits a signal indicative of the predetermined transmission rate used to decode and encode the received data frame to a vocoder. At the subsequent step 250, it is determined whether the reception of all data frames is complete. If it is determined at step 250 that reception of all data frames is not complete, the program returns to the step 220 until the complete reception of all data frames is complete.

On the other hand, if it is determined at step 230 that there are errors in an amount not less than the predetermined threshold value, the program proceeds to step 260 where the transmission rate detector 100 increments the transmission rate parameter "n" by "1" (n=n+1), then sets the n to a value obtained from the application of "n" and "k" to a percent function (n=n % k), i.e., the remainder after dividing "n" by "k". The "k" represents the transmission rate and if the transmission rate includes "9.6 kbps, 4.8 kbps, 2.4 kbps, and 1.2 kbps","k" becomes 4. The role of the % function is to limit the value "n" within a predetermined limit for identifying the transmission rates, as shown in the below Table 1. That is, if there are continuously generated errors in an amount greater than the predetermined threshold value, the transmission rate detector 100 sets the transmission rate parameter"n" to next higher transmission rate parameters other than the previous transmission rate parameter used to decode and encode the received data frame signal. Namely, the transmission rate parameter "n" is replaced in an order of "1→2→3→0→1". For example, the relationship between the parameter "n" and the transmission rates can be expressed by Table 1 below.

TABLE 1

| N | 1 | 2 | 3 | 0 |
|---|---|---|---|---|
| Transmission rates | 9.6K | 4.8K | 2.4K | 1.2K |

An embodiment according to FIG. 2 will be described briefly hereinbelow.

When a data frame is received by the de-interleaver 110 from the modulator-demodulator, a frame signal corresponding to the data frame is decoded and encoded by the encoder 130 and decoder 120 at a predetermined transmission rate.

Then, the encoded frame signal is compared with the signal corresponding to the data frame received by the de-interleaver from the modulator-demodulator. Based on the comparison result, if there are errors in an amount less than a predetermined threshold value, the next data frame is decoded and encoded at the same predetermined rate used to decode and encode in the previous data frame signal. On the other hand, if there are errors in an amount greater than the predetermined threshold value, a frame signal corresponding to the next data frame is decoded and encoded at different transmission rates other than the predetermined transmission rate used to decode and encode in the previous data frame signal. Consequently, the transmission rate is continuously adjusted to another transmission rate other than the previously used transmission rate until the generated error based on the comparison test is less than the predetermined threshold value.

Figure 3:
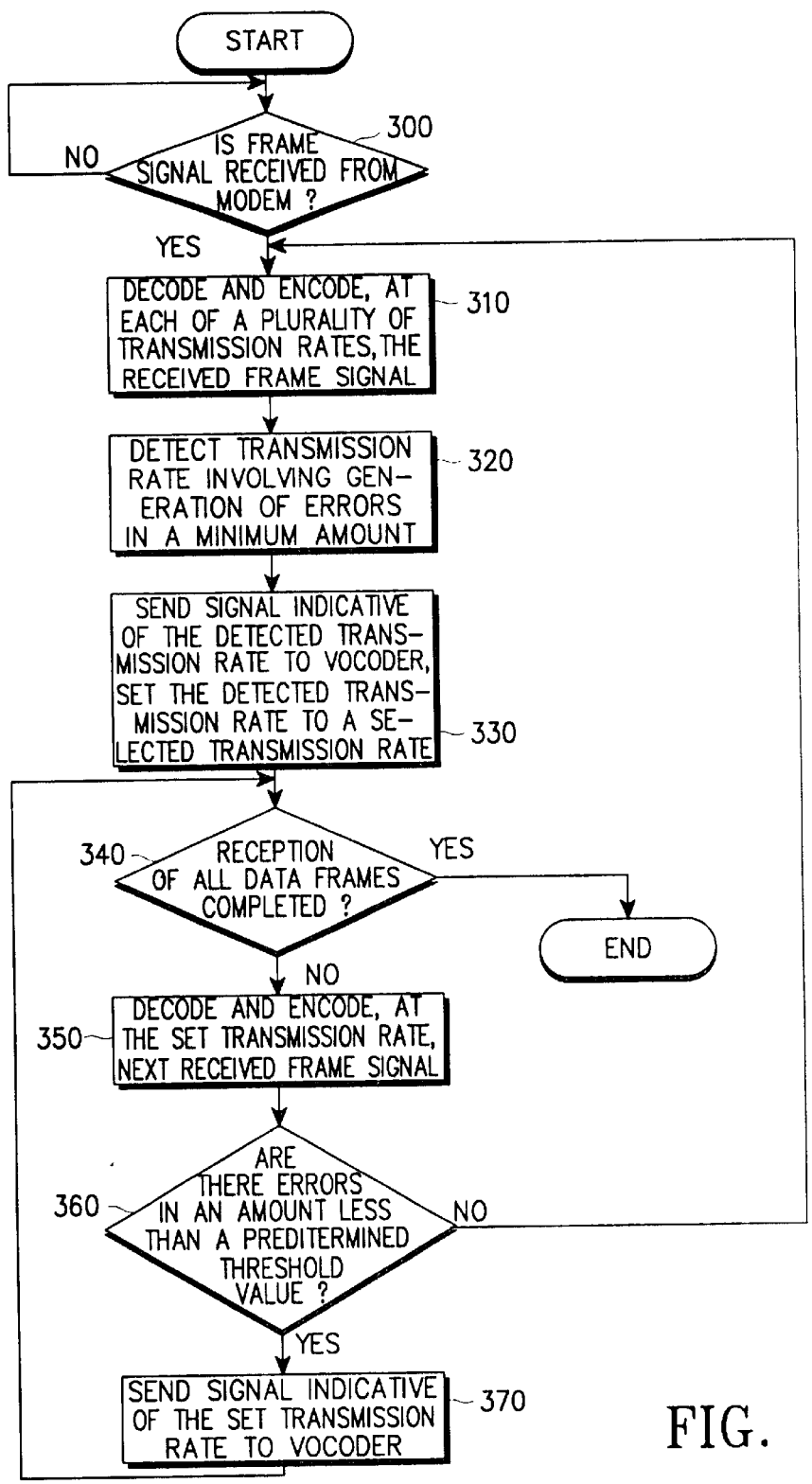

FIG. 3 is a flowchart illustrating the process of implementing the demodulating operation according to another preferred embodiment of the present invention.

At step 300, the transmission rate detector 100 determines whether a data frame is received by the de-interleaver from the modulator-demodulator. If it is determined at step 300 that the de-interleaver receives the data frame from the modulator-demodulator, the program proceeds to step 310 in which the transmission rate detector 100 allows the decoder 120 and the encoder 130 to decode and encode the frame signal corresponding to the received data frame at each different transmission rates. At a subsequent step 320, the transmission rate detector 100 compares each of the encoded frame signals at different transmission rates with the original data frame signal received from the modulator-demodulator, i.e., the signal de-interleaved by the de-interleaver 110. Then, the transmission rate detector 100 detects a particular transmission rate, which generates the least amount of error. In the next step 330, the transmission rate detector 100 sets the transmission rate parameter "n" to the parameter representative of the detected transmission rate having the lowest error and transmits a signal indicative of the detected transmission rate having the lowest error to the vocoder. At this time, the program proceeds to step 340 where it is determined whether the reception of all data frames is completed.

If it is determined at step 340 that the reception of all data frames is not complete, the program returns to the step 350 and the transmission rate detector 100 allows the decoder 120 and the encoder 130 to decode and encode the next frame signal corresponding to the data frame de-interleaved by the de-interleaver 110 at the set transmission rate in step 330. At the subsequent step 360, the transmission rate detector 100 compares the newly encoded frame signal with the next de-interleaved data frame signal to determine whether there are errors in an amount less than a predetermined threshold value. If it is determined at step 360 that there are errors in an amount less than a predetermined threshold value, the program proceeds to step 370 where the transmission rate detector 100 transmits a signal indicative of the set transmission rate used to decode and encode the next received data frame signal to a vocoder. Then, the program returns to the previous step 340 to further execute the subsequent steps until the complete reception of all data frames. However, if it is determined in step 360 that there are errors in an amount greater than the predetermined threshold value, the program returns to the previous step 310 to select the optimal transmission rate yielding the lowest error.

The above-mentioned steps 310 through 330 are conventional algorithm used to detect a transmission rate. In such conventional algorithm, if it is determined at step 340 that reception of all data frames has not been completed, the program directly returns to the previous step 310 in which the transmission rate detector 100 has to allow the decoder 120 and the encoder 130 to decode and encode again at each different transmission rate.

An embodiment according to FIG. 3 will be described briefly hereinbelow.

When a data frame is received by the de-interleaver 110 from the modulator-demodulator, the transmission rate detector 100 allows the decoder 120 and the encoder 130 to decode and encode, at each of the plurality of transmission rates, the frame signal corresponding to the data frame in order to detect an optimal transmission rate, i.e., a transmission rate involving the generation of errors in a minimum amount. Then, when next data frame is received by the de-interleaver 110, the transmission rate detector 100 allows the decoder 120 and the encoder 130 to decode and encode a frame signal corresponding to the next data frame at the detected optimal transmission rate. The transmission rate detector 100 compares the newly encoded frame signal with the next data frame signal from the de-interleaver 110. Based on the comparison result, if there are generated errors in an amount greater than the predetermined threshold value, the transmission rate detector 100 detects for another optimal transmission rate again.

While this invention has been described in connection with what is presently considered to be the most practical and preferred embodiment, it is to be understood that the invention is not limited to the disclosed embodiment, but to the contrary, it is intended to cover various modifications within the spirit and the scope of the appended claims.

What is claimed is:

1. A method for detecting a transmission rate in a wireless communication terminal employing a Code Division Multiple Access (CDMA) scheme, the method using a circularly repetitive sequence of candidate transmission rates and comprising the steps of:

(a) in response to the reception of a current data frame in a de-interleaver from a modulator-demodulator, assigning as a current rate an initial rate from among the candidate rates;

(b) decoding and encoding, at the current rate, a frame signal corresponding to said current frame;

(c) comparing the decoded and encoded frame signal with a frame signal received from the modulator-demodulator to determine whether a comparison error is less than a predetermined threshold value;

(d) if the comparison error is less than the predetermined threshold value, transmitting a signal indicative of said current rate to a vocoder, determining whether a subsequent frame exists in the de-interleaver, if a subsequent frame exists in the de-interleaver, returning to the step (b) using the subsequent frame as the current frame, and returning to the step (a) if a subsequent frame does not exist in the de-interleaver; and (e) if the comparison error is greater than the predetermined threshold value, substituting for said current rate a next transmission rate in said circularly repetitive sequence and returning to the step (b).

* * * * *